Aug. 28, 1962 J. L. JENSEN 3,051,873

TEMPERATURE COMPENSATED TRANSISTOR CIRCUIT

Filed Nov. 17, 1954

INVENTOR.
JAMES L. JENSEN
BY Frederick E. Lange
ATTORNEY 3,051,873
Patented Aug. 28, 1962

3,051,873
TEMPERATURE COMPENSATED TRANSISTOR CIRCUIT

James Lee Jensen, St. Louis Park, Minn., assignor to Minneapolis-Honeywell Regulator Company, Minneapolis, Minn., a corporation of Delaware Filed Nov. 17, 1954, Ser. No. 469,360
7 Claims. (Cl. 317—148.5)

This invention relates to a transistor controlled relay circuit which has an imroved and novel arrangement for eliminating the effects of temperature changes on circuit parameters.

An object of this invention is to provide a transistor controlled circuit which has means to compensate for changes in transistor leakage current with changes in temperature.

Another object of this invention is to provide in a transistor controlled relay circuit means for stabilizing the operating point of the relay by eliminating the effect of the changing transistor leakage current with temperature variations.

Figure 1:
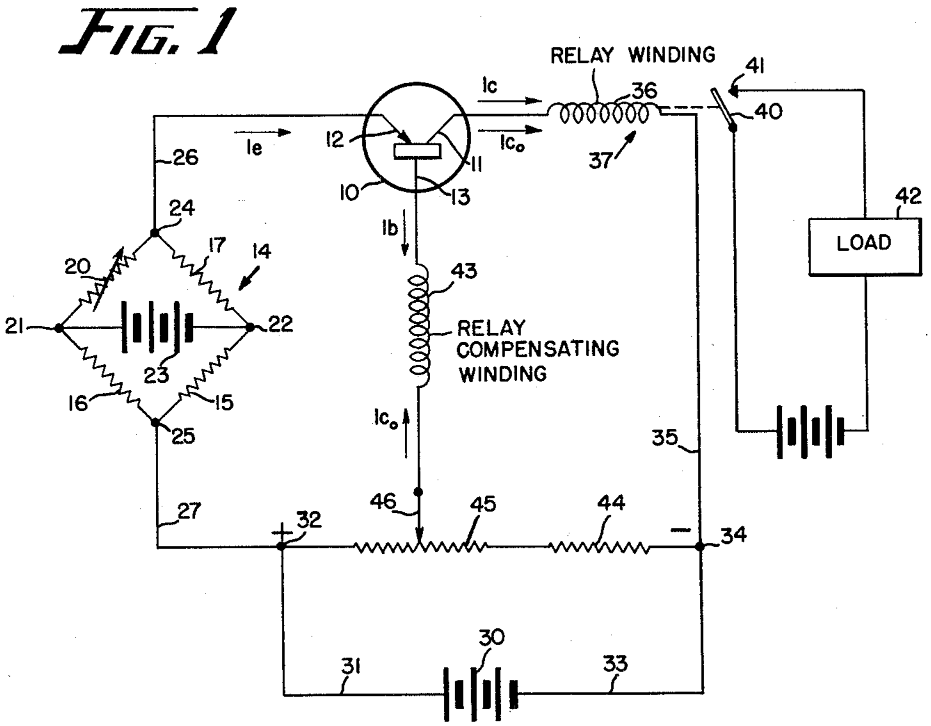
Figure 2:
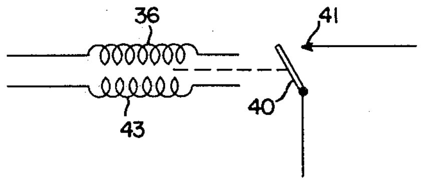

These and other objects of the present invention will be understood upon consideration of the accompanying specification, claims and drawing of which:

FIGURE 1 of the drawing is a diagrammatic representation of an embodiment of the invention, and FIGURE 2 shows the relation of the windings of the relay of FIGURE 1.

Referring now to the drawing there is disclosed in FIGURE 1 a preferred embodiment of the invention comprising a transistor controlled relay circuit with means to prevent temperature variations from affecting the operating point of the relay. A transistor 10, which may be a PNP junction type, has a plurality of electrodes including a collector electrode 11, an emitter electrode 12 and a base electrode 13. As shown in the drawing the transistor is connected in the grounded base configuration. The transistor amplifier input terminals are emitter 12 and base 13, and the output terminals are collector 11 and base 13. Although the circuit is shown in the grounded base configuration for purposes of explanation, the invention is equally applicable to other configurations. The input control signal for the transistor 10 may be obtained from a conventional bridge circuit 14 as shown, or other suitable potential producing means. The bridge comprises four resistance legs including three legs of fixed impedance these being numbered 15, 16 and 17 and a condition sensitive leg 20 which may be, for example, a temperature responsive resistance element located in a region whose temperature is to be sensed. The bridge 14 is energized at input terminals 21 and 22 by a battery 23 or other D.C. source connected thereto. Bridge output terminals 24 and 25 are connected to the input circuit of the transistor 10 to control the conduction of the transistor. Terminal 24 is connected to emitter 12 by a conductor 26. Terminal 25 is connected to base 13 through a bias circuit to be described. A battery 30 supplies the power for the circuit and is connected to emitter 12 through a series circuit consisting of a conductor 31, a junction 32, a conductor 27, terminal 25, bridge 14, terminal 24 and conductor 26. The battery 30 is connected to collector 11 through a circuit consisting of a conductor 33, a junction 34, a conductor 35, and a relay winding 36 of a load relay 37. Relay 37 also includes contacts 40 and 41, and a compensating winding 43 having the same number of turns as winding 36. Winding 43 opposes winding 36 and this relay construction is shown clearly in FIGURE 2. A resistance element 44 and a potentiometer 45 having a wiper 46 are connected in series between junctions 32 and 34, across battery 30. Base electrode 13 is connected to wiper 46 through the relay compensating winding 43 to connect electrode 13 to the battery 30 by means of the potentiometer. It may be seen that the bias applied between the emitter and base electrodes is of a polarity as to bias them in a relatively conducting polarity or forward direction and that the bias applied between collector and base electrodes is of a polarity to bias them in a relatively nonconducting polarity or reverse direction. Adjustment of wiper 46 along potentiometer 45 controls the operating bias of the transistor. Relay contacts 40 and 41 control the energization of a load device 42.

The operation of the circuit may be explained in the following manner. The transistor amplifier relay circuit receives its energization from battery 30. A mesh current path can be traced from the battery through conductors 31 and 27, bridge 14, conductor 26, emitter to collector of transistor 10, relay winding 36, and conductors 35 and 33 back to the battery. A current path may also be traced from battery 30 through conductor 31, junction 32, potentiometer winding 45, resistor 44, junction 34, and conductor 33 back to the battery.

The current $Ie$ flowing into emitter 12 may be considered as dividing and flowing out of both the collector and the base. The collector current $Ic$ is equal to $Ie\alpha$ and the base current $Ib$ is equal to $Ie\ (1-\alpha)$ where $\alpha$ is defined as the ratio of the change in collector current for a specific change in emitter current at a constant collector potential. In the junction transistor $\alpha$ approaches but is less than 1. The transistor has a leakage current denoted as $Ic_0$ which flows from base to collector of the transistor and which is affected by temperature such that the current tends to increase exponentially with temperature increase. Under balanced conditions, that is, with no output signal being developed in the D.C. bridge, potentiometer wiper 46 is adjusted along the winding 45 thereby varying the bias applied to the base electrode until the desired quiescent current flows through relay winding 36. This current may be adjusted, for example, to a value just below the drop out point of the relay. The exponential rise of leakage current $Ic_0$ with temperature poses a special problem since the increase in leakage current may amount to several thousand percent from room temperature to temperature of about 100° C. Thus changes of a few degrees of the transistor may be sufficient to actuate the relay in the absence of a control signal and thus vary the control point of the operation of the relay. In the subject invention, however, the effect caused by the changing temperature is eliminated by providing a compensating winding 43 on the same core as relay winding 36, which preferably has the same number of turns as the main winding 36. The compensating winding is connected in the base circuit of the transistor in such a direction that the field induced in the relay due to $Ic_0$ flowing through the compensating winding 43 opposes and cancels the field induced in the relay by the same leakage current flowing in the main winding 36. This opposed relation of the windings is shown in FIGURE 2. Thus as temperature changes cause $Ic_0$ to increase in the collector circuit which includes relay work coil 36 tending to actuate the relay, the increased leakage current also flows in the compensating winding 43 which opposes the main winding so that the effect of varying leakage current is eliminated.

With wiper 46 adjusted so that the relay is deenergized at zero signal conditions, it can be seen that as the conditions change so that sensing resistor 20 decreases in resistance making bridge terminal 24 positive with respect to terminal 25, the bias between base and emitter is changed causing the transistor to conduct more current thus tending to pull in the relay. The input current $Ie$ has a large portion $Ie\alpha$ flowing through the load relay winding 36 and only Ie (1−α) flowing through the compensating winding so that while the effects of the leakage currents are eliminated, changes in the emitter current are not cancelled out by the two windings.

While windings 36 and 43 have been shown and described as relay windings for the purpose of illustration it will be clear to one skilled in the art that the invention also applies to other circuits which may be controlled by a transistor such as, for example, solenoid windings or control windings of a magnetic amplifier.

In general while I have shown a specific embodiment of my invention, it is to be understood that this is for the purposes of illustration and that my invention is to be limited solely by the scope of the appended claims.

I claim as my invention:

1. Transistor controlled current responsive apparatus comprising: transistor means having a plurality of electrodes including a collector electrode, an emitter electrode, and a base electrode, said transistor means being subject to a base-to-collector leakage current which varies with temperature changes; current responsive means having a plurality of elements; a source of direct current potential for energizing said apparatus; means for producing a signal potential in response to a condition, which means is connected to the input circuit of said transistor means for controlling the condition thereof; means connecting said current responsive means in the output circuit of said transistor means, a first of said elements being connected to said collector electrode and energized by the collector current, and a second of said elements on said current responsive means connected in the base circuit of said transistor means which element produces an effect in said current responsive means due to said base-to-collector leakage current which is equal to and opposes the effect developed in said current responsive means due to the leakage current flowing through said first element.

2. Transistor controlled current responsive apparatus comprising: transistor means having a plurality of electrodes including a collector electrode, an emitter electrode, and a base electrode, said transistor means being subject to a base-to-collector leakage current which varies with temperature changes; current responsive means having a plurality of windings; a source of direct current potential for energizing said apparatus; means for producing a signal potential in response to a condition, which means is connected to the input circuit of said transistor means for controlling the conduction thereof; means connecting said current responsive means in the output circuit of said transistor means, a first of said windings being connected to said collector electrode and energized by the collector current, and a second of said windings on said current responsive means connected in the base circuit of said transistor means which winding produces an effect in said current responsive means due to said leakage current which is equal to and opposed to the effect developed in said current responsive means due to the leakage current flowing through said first winding.

3. Transistor controlled current responsive apparatus comprising: transistor means having a plurality of electrodes including a collector electrode, an emitter electrode, and a base electrode; means for applying a voltage in the forward direction between said emitter and base electrodes; means for applying a voltage in the reverse direction between said collector and base electrodes; said transistor being subject to a base-to-collector leakage current which varies in magnitude with temperature changes; current responsive means having a plurality of elements; means for connecting a source of signal potential to the input circuit of said transistor means for controlling the conduction of said transistor means; means connecting said current responsive means in the output circuit of said transistor means, said means thereby connecting a first of said plurality of elements to said collector electrode, said first element being energized by the current flowing through said collector electrode; and further means connecting a second of said plurality of elements on said current responsive means in the base circuit of said transistor means, which second element produces an effect in said current responsive means due to said leakage current flowing therethrough, which effect is equal to and opposes the effective developed in said current responsive means due to said leakage current flowing through said first element, so that the leakage current has no effect on the control point of said apparatus.

4. Transistor controlled current responsive apparatus comprising: transistor means having a plurality of electrodes including a collector electrode, an emitter electrode, and a base electrode; means for applying a voltage in the forward direction between said emitter and base electrodes; means for applying a voltage in the reverse direction between said collector and base electrodes; said transistor subject to a base-to-collector leakage current which varies in magnitude with temperature changes; current responsive means having a plurality of windings; means for connecting a source of signal potential to the input circuit of said transistor means for controlling the conduction of said transistor means; means connecting said current responsive means in the output circuit of said transistor means, said means thereby connecting a first of said plurality of windings to said collector electrode, said windings being energized by the current flowing through said collector electrode; and further means connecting a second of said plurality of windings on said current responsive means in the base circuit of said transistor means, which second winding produces an effect in said current responsive means due to said leakage current flowing therethrough, which effect is equal and opposes the effect developed in said current responsive means due to said leakage current flowing through said first winding, so that the leakage current has no effect on the control point of said apparatus.

5. Temperature compensated transistor controlled apparatus comprising: transistor means having a plurality of electrodes including a base electrode, an emitter electrode, and a collector electrode, said transistor means having an input circuit connected to said base electrode and another of said electrodes, said transistor means having an output circuit connected to a third of said electrodes and connected in common with one of said electrodes of said input circuit; inductive load means connected to said output circuit comprising a plurality of windings including a main winding and a compensating winding, said main winding being connected in the collector circuit, and said compensating winding being connected in the base circuit to prevent the inductive load means from responding to the effect of a temperature variable base-to-collector leakage current flowing through said main winding.

6. Temperature compensated transistor controlled apparatus comprising: transistor means having a plurality of electrodes including a base electrode, an emitter electrode and a collector electrode; input circuit means connected to said base and emitter electrodes including means for applying a voltage in the forward direction between said emitter and base electrodes; output circuit means connected to said collector electrode and to one of said base and emitter electrodes and including means for applying a voltage in the reverse direction between said collector and base electrodes, said transistor being subject to a base-to-collector leakage current which varies in magnitude with temperature changes; inductive load means connected to said output circuit means comprising a plurality of windings including a main winding and a compensating winding, said main winding being connected in the collector circuit, and said compensating winding being connected in the base circuit so that said leakage current flows through both of said windings to prevent the inductive load means from responsive to the effect of the temperature variable leakage current.

7. Control apparatus comprising: transistor means having a plurality of electrodes including a base electrode, a collector electrode and an emitter electrode; means for producing a signal potential in response to a condition; means connecting said signal producing means to said emitter and base electrodes to control operation of said transistor means; a source of potential for energizing said apparatus; relay load means having a plurality of relay windings on a single core including a main winding and a compensating winding; circuit means connecting said main winding to said collector electrode so that the output current of said transistor flows through said windings; further circuit means connecting said compensating winding to said base electrode so that the effect of the base-to-collector leakage current which flows through said main winding, the magnitude of which varies with temperature, is cancelled by the leakage current flowing through said compensating winding.

References Cited in the file of this patent

UNITED STATES PATENTS

| | | |
|---|---|---|
| 2,693,572 | Chase | Nov. 2, 1954 |
| 2,802,071 | Lin | Aug. 6, 1957 |
| 2,808,471 | Poucel et al. | Oct. 1, 1957 |